United States Patent [19]
Carlson

[11] Patent Number: 6,076,640
[45] Date of Patent: *Jun. 20, 2000

[54] FISHING REEL WITH DYNAMIC DRAG

[75] Inventor: Donald Carlson, Mesa, Ariz.

[73] Assignee: Dcon3, Inc., Mesa, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,814

[22] Filed: Sep. 13, 1996

[51] Int. Cl.$^7$ ...................................................... F16D 63/00
[52] U.S. Cl. ........................... 188/82.1; 242/289; 242/298
[58] Field of Search ..................................... 188/184, 82.7, 188/82.1, 72.8; 242/289, 285, 231, 298 287

[56] References Cited

U.S. PATENT DOCUMENTS

| | | | |
|---|---|---|---|
| 2,853,252 | 9/1958 | Thiel | 242/84.52 |
| 3,308,021 | 3/1967 | Ikuta | 242/289 |
| 3,317,159 | 5/1967 | Morritt | 242/84.52 |
| 3,721,399 | 3/1973 | Mroz | 242/84.51 R |
| 3,829,041 | 8/1974 | Nepote | 242/218 |
| 3,874,615 | 4/1975 | Fukushima | 242/219 |
| 4,196,871 | 4/1980 | Kobayashi | 242/84.52 A |
| 4,344,586 | 8/1982 | Puryear | 242/84.5 A |
| 4,402,470 | 9/1983 | Hamayasu | 242/84.52 R |
| 4,482,106 | 11/1984 | Kovalovsky | 242/84.1 R |
| 4,535,954 | 8/1985 | Worth et al. | 242/84.52 B |
| 4,811,916 | 3/1989 | Yeh | 242/84.2 R |
| 4,821,977 | 4/1989 | Schuster | 242/220 |
| 5,372,324 | 12/1994 | Sato | 242/312 |

*Primary Examiner*—Mark T. Le
*Assistant Examiner*—Pamela J. Lipka
*Attorney, Agent, or Firm*—Patrick M. Dwyer

[57] ABSTRACT

A dynamic drag for a fishing reel. The drag has a brake rotor and a brake pad moveable into engagement with the rotor, and a pivotally mounted eccentric engaging the brake pad to force it frictionally against the rotor. In one embodiment the eccentric is axially eccentric and has a pivotally mounted "pie" section "ramp", whereby lever actuation of the ramp rotates it against the rotor with increasing force.

5 Claims, 9 Drawing Sheets

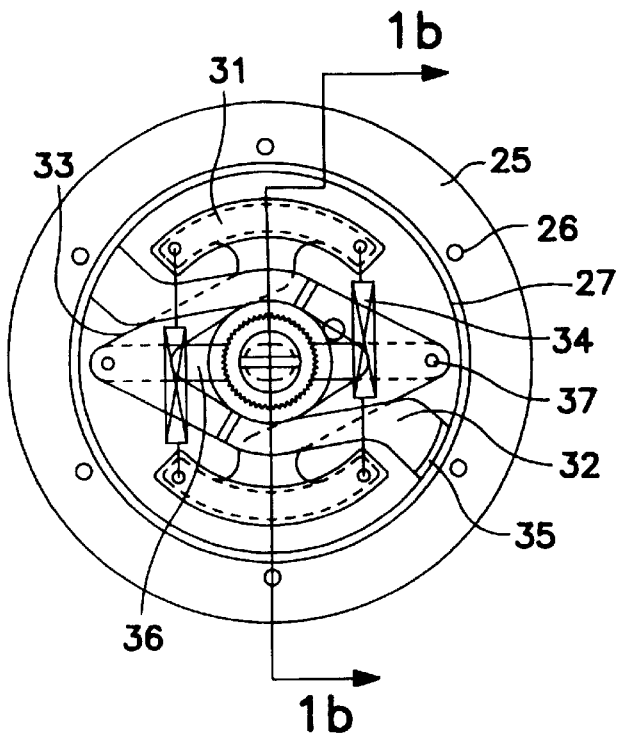
FIG. 1a
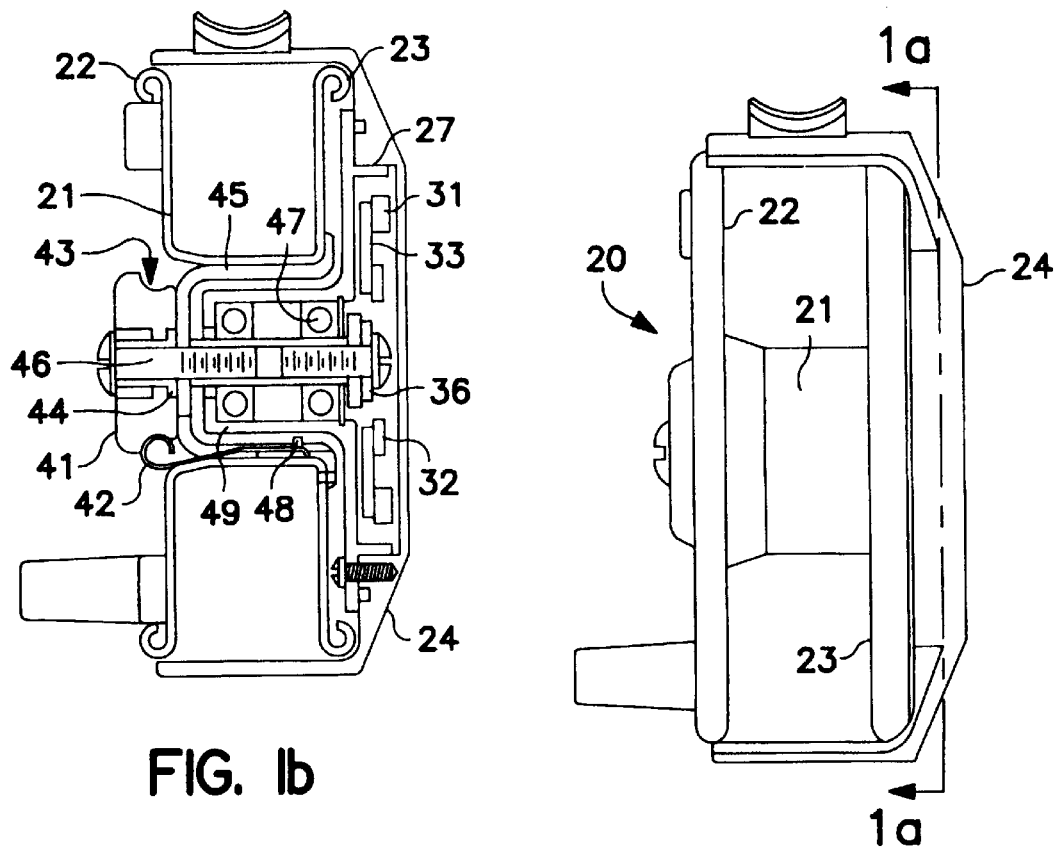
FIG. 1b
FIG. 1c

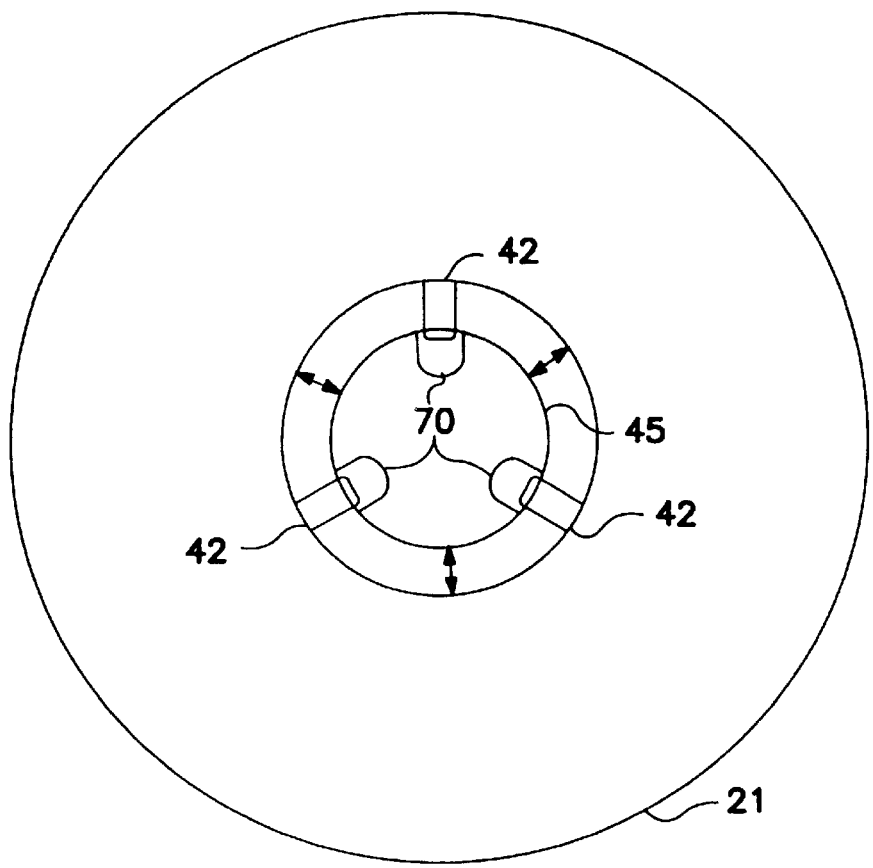
FIG. 6
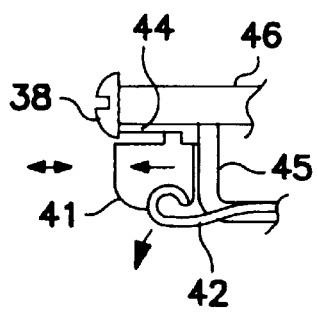
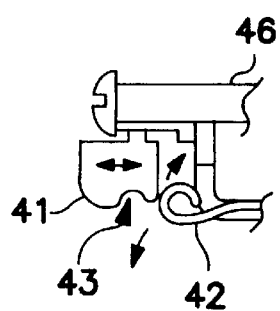
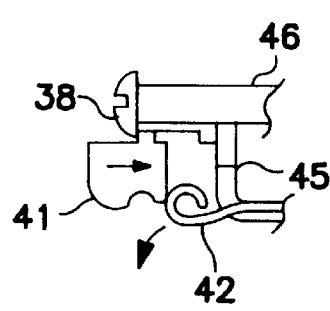
FIG. 7a　　FIG. 7b　　FIG. 7c

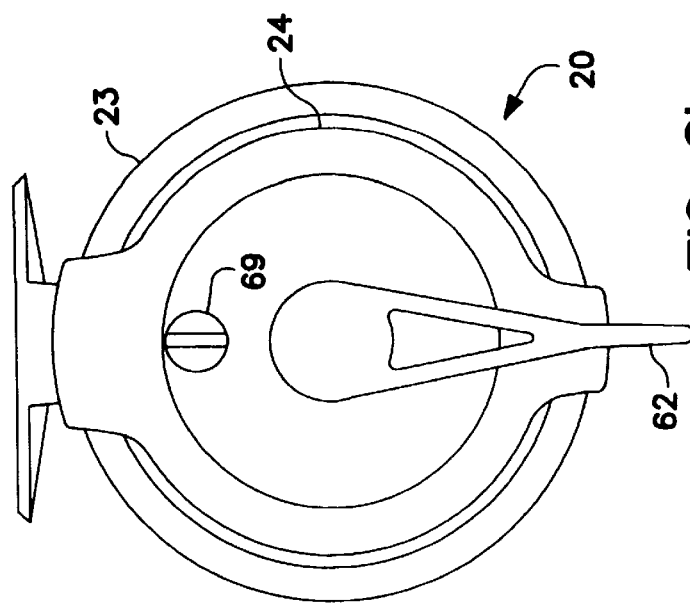
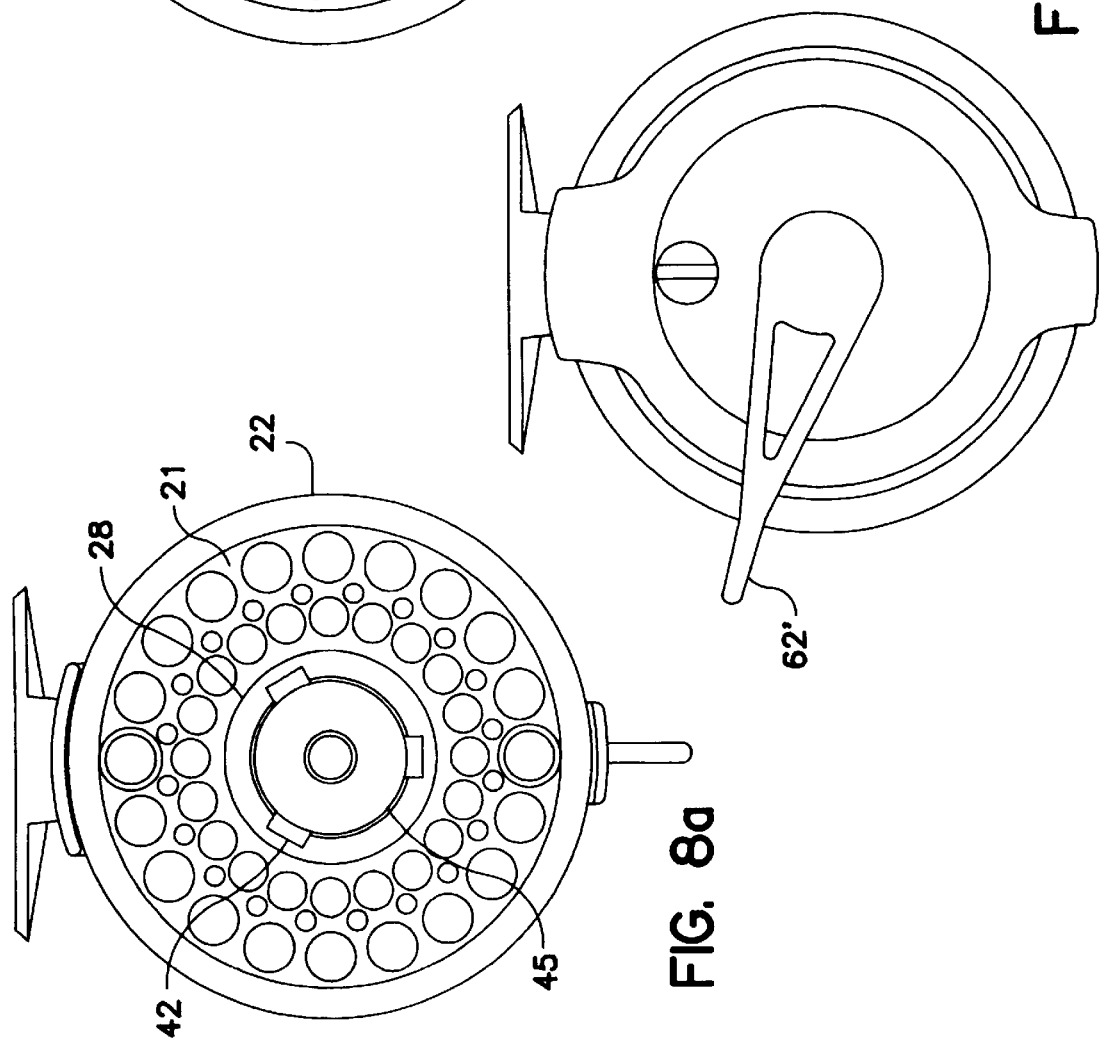
FIG. 8a
FIG. 8b
FIG. 8b'

FISHING REEL WITH DYNAMIC DRAG

TECHNICAL FIELD

The invention relates to the field of sports fishing equipment; more particularly, it relates to improvements in fishing reels and especially to a fly reel having a dual palm drag, a dynamic drag, a quick release spool, and/or a dynamic anti-backlash system.

BACKGROUND OF THE INVENTION

A good trout or saltwater fly reel will cost between $250 and $400, with replacement spools accounting for as much as half of the cost. When a different type or weight line is wanted, as can happen many times during a single fishing outing, there is presently no alternative but to replace the spool in the fly reel. Thus an avid fisherman has to buy, and then carry, as much as one spool for every kind and weight of line he or she intends to fish with on that day. Conventional replaceable spools incorporate the bearings and bearing surfaces into the spool itself, and the fit of the spool to the reel is therefore critical, both factors tending to drive up the cost of a replacement spool. Even if different lines will not be needed on a particular day, the fisherman will still usually want to fish somewhere different on the next occasion, and will have to replace the spool for the next outing. What is needed is a low cost, tolerant replaceable spool, preferably having no bearings or bearing surfaces of its own. Present mechanisms such as that disclosed by Yeh in U.S. Pat. No. 4,811,916, the text of which is herewith incorporated by this reference, do not fully address these needs.

In addition, conventional fly reels employ a so called static drag mechanism that actually discourages savvy fishermen from fully using it, since a sudden strike or rush of the fish on the line with the static drag on too tight can either break the line or even pull the entire fishing rig into the water. Conventional reels also use a so called palm drive braking mechanism that has the disadvantage that the fisherman's fingers are very near the winding handle as the reel spins out, and if the handle even momentarily strikes a finger, the sudden impulse resistance on the line can break the line or pull the hook. What is needed, especially in a fly reel, is a second or dual palm drag providing a rim for palm or thumb that is on the opposite side of the spool from the winding handle. This is generally not possible in conventional designs because the spool is highly enclosed to protect it and the exposed bearings from water and salt, and the second rim, even if available on the spool itself, is not available to the fisherman.

What is also needed, especially in a fly reel, is a dynamic, or live, drag mechanism that allows the fisherman to apply exactly the right amount of drag dynamically at all times, without removing his or her concentration from the fish, and without danger of sudden rush on the line causing line damage or loss of the fish.

Various attempts have also been made to deal with the problems of "backlash", few of which appear to have been widely accepted, most fisherman still preferring their thumbs for truly delicate casting without backlash. As is summarized well in U.S. Pat. No. 2,853,252 to Thiel, these attempts to prevent over running of the line by the spool when the spool speed at some point in the cast exceeds the line speed all involve some means of slowing the spool as the line tension decreases. Some operate with direct contact to the line, or constant spring induced frictional resistance to the spool, others employ sophisticated electronic sensors and integrated circuitry to detect and control spool speed. Some are prone to introducing unwanted friction on the line during the cast itself, thus reducing its distance. Others problematically apply the wrong amount of resistance at less than the optimal times for each cast. What is needed is an anti-backlash mechanism that applies very little frictional resistance at the most, and then only at the very end of the cast as the spool rpm's first begin to slow, and which therefore permits skilled fisherman to even cast off the rod without first laying out yards of line preparatory to making the cast.

DISCLOSURE OF THE INVENTION

Accordingly, it is an object of the invention to provide a low cost, tolerant replaceable spool for a fly reel, preferably having no bearings or bearing surfaces of its own.

It is a further object of the invention to provide a means to quickly and securely remove and replace, or interchange, a spool in a reel, even if the spool does not fit closely on the reel.

It is another object of the invention to provide a second rim or dual palm drag providing a rim for palm or thumb that is on the opposite side of the spool from the winding handle.

It is another object of the invention to provide a reel housing that is designed to permit ready access to the second rim for a dual palm drag.

It is a further object of the invention to provide a dynamic, or live, drag mechanism that allows exactly the right amount of drag to be applied dynamically without danger of sudden rush on the line causing line damage or loss of the fish. It is another object of the invention to provide an anti-backlash mechanism that applies very little frictional resistance at the most, and then only at the very end of the cast as the spool rpm's first begin to slow.

It is also an object of the invention to provide an anti-backlash mechanism that permits skilled fly fisherman to cast off the rod without first laying out yards of line preparatory to making the cast.

It is yet another object of the invention to meet any or all of the needs summarized above.

These and such other objects of the invention as will become evident from the disclosure below are met by the invention disclosed herein.

The invention addresses and provides such a system. Application of the invention to these needs is especially beneficial in that the invention is the only system that effectively provides a fly reel having a dual palm drag, a dynamic drag, a quick release spool, and a dynamic anti-backlash system, and combinations of these features, in a rugged, low cost dependable mechanism.

The invention provides a fishing line (fly) reel with dual palm drag and dynamic drag, quick release spool and dynamic anti-backlash system. The dynamic anti-backlash system has a friction brake and the friction brake has a generally circular friction surface, such as a brake drum or a brake rotor. The friction brake employs a brake pad, with the brake pad mounted on a preferably eccentrically pivoted brake lever. The brake lever is pivotally mounted on a brake lever base that is keyed to a rotatable spool shaft for co-rotation with the spool shaft. It also has a dynamic centrifugally activated brake release that employs a rotatable counter weight operably connected to the brake lever, whereby rotation of the spool shaft and brake lever base imparts rotation to the rotatable counter weight to generate a centrifugal force acting on a center of mass of the rotatable counter weight to displace the rotatable counter weight and connected brake lever to thus release the brake.

The invention also provides a fishing reel with an enclosed bearing spindle unit and a spool removably mounted on the spindle is also presented. The spool preferably has a double palm drag, the rear drag rim of which is made accessible by design of the rear housing of the reel. Another aspect of the invention is a spool release, the spool release employing resilient spool centering. This means any resilient means such as springs or resilient sleeves (such as compressible rubber and the like) which can be compressed as the spool is installed and then which with respect to each other uniformly expand to center the spool on the top hat. One alternate is to mount bow shaped springs equilaterally and axially around the circumference of the top hat for this purpose.

The spool release also has a release button having at least one circumferentially disposed indentation, and the indentation has an axially cross sectional radius corresponding to the radius of a rounded head of at least one of the springs for releasable engagement of the rounded head in the indentation. This indentation preferably extends around the entire circumference of the button, but may also advantageously be a number of discreet indentations generally symmetrically disposed around the circumference.

Another aspect of the invention is a dynamic drag for a fishing reel. The drag has a brake rotor and a brake pad moveable into engagement with the rotor, and a pivotally mounted eccentric engaging the brake pad to force it frictionally against the rotor. In one embodiment, the eccentric is axially eccentric, and has a pivotally mounted "pie" section "ramp", whereby lever actuation of the ramp rotates it against the rotor with increasing force.

One embodiment of the invention is a dynamic anti-backlash system. It has a friction brake and the friction brake has a friction surface such as a brake drum or a brake rotor. The friction brake employs a brake pad, with the brake pad mounted on a preferably eccentrically pivoted brake lever. The brake lever is pivotally mounted on a brake lever base that is keyed to a rotatable spool shaft for co-rotation with the spool shaft. It also has a dynamic centrifugally activated brake release that employs a rotatable counter weight operably connected to the brake lever, whereby rotation of the spool shaft and brake lever base imparts rotation to the rotatable counter weight to generate a centrifugal force acting on a center of mass of the rotatable counter weight to displace the rotatable counter weight and connected brake lever to thus release the brake.

The brake lever is advantageously pivotally mounted at a pivot point lying on a non-diameter chord across the friction surface, the chord disposed so that the center of mass of the rotatable counter weight and the center of the friction surface are both on the same side of the chord. Preferred embodiments employ a pair of diametrically opposing rotatable counter weights, and the friction brake is spring biased to the braked position. Preferably the brake pad itself is of some very low friction material such as Teflon® or Delrin®, and are replaceable by means of removably slidably mounting the pads on pins integral to the end of the brake lever.

Another embodiment of the invention is a fishing reel with an enclosed bearing spindle unit and a spool removably mounted on a top hat, itself rotatable on the spindle. "Top hat" is a term used herein to cover any piece on which a spool may be mounted or installed, and which is co-rotatably mounted on the spindle. The term top hat comes from the preferred shape and color of the piece—it is black and shaped like a top hat. Preferred embodiments accept quite loose tolerances in the fit between the spool bore and the top hat on the spindle. The spool preferably has a double palm drag, the rear drag rim of which is made accessible by a rear housing that does not enclose the rear rim, and preferably does not enclose the spool, so that the spool/housing are truly "open face". By enclose is preferably meant substantially entirely enclose, although any housing which leaves most of the rear rim exposed can be said to be a non-enclosing housing.

Another aspect of the invention is a spool release, the spool release employing resilient spool centering. Though the springs do not actually key the spool to the top hat, it is conventionally otherwise keyed. Resilient spool centering is preferably effected with at least three springs resiliently mounted axially on the inner circumference of the top hat spool shaft. The spool release also has a release button having at least one circumferentially disposed indentation, and the indentation has an axially cross sectional radius corresponding to the radius of a rounded head of at least one of the springs for releasable engagement of the rounded head in the indentation. The button is preferably axially sidably mounted on the top hat spindle, and dimensioned so that when it is pushed "in" so the rounded spring head engages the indentation, the spring resiliently presses against the spool, and preferably against a bevel in the spool central passage. In that position, spring tension engagement of the rounded head holds the button "in", and so that when sufficient force is exerted to pull the button "out", the rounded head resiliently snaps back to the spindle, thereby releasing the spool, and the rounded head then advantageously holds the button "out".

Yet another aspect of the invention is a dynamic drag for a fishing reel. The drag has a brake rotor and a brake pad moveable into engagement with the rotor, and a pivotally mounted eccentric engaging the brake pad to force it frictionally against the rotor. In one embodiment, the eccentric is axially eccentric, and has a distally disposed thrust surface. The eccentric itself is a pivotally mounted "pie" section "ramp", whereby lever actuation of the ramp rotates it against the brake pads, and preferably between the brake pad and the thrust surface, so that increasing "flare" of the ramp causes increasing force on the brake pad.

An alternate embodiment has a distally disposed thrust surface and the eccentric is radially eccentric. The eccentric is a pivotally mounted cam rotatably thrustable against a spring biased wedge, the wedge slidably engaged between the brake pad and the thrust surface so that increasing cam "thrust" causes increasing force on the brake pad. In another alternate embodiment the eccentric is also radially eccentric, but the eccentric is a pivotally mounted cam rotatably thrustable against the brake pad, with the cam rotatable by a pivotally mounted lever, one end of which engages an opening in the side of the cam at a distance from the axis of cam rotation, the lever generally normal to the cam side.

BRIEF DESCRIPTION OF THE DRAWINGS

FIG. 1 is a set of drawings a–c of an embodiment of the invention; FIG. 1a is a rear elevational cutaway view along line 1a in FIG. 1c; FIG. 1b is a sectional side elevation along line 1b of FIG. 1a; FIG. 1c is a side elevation.

FIG. 2 is a set of drawings a–b of the embodiment of the invention shown in FIG. 1.

FIG. 3 is a set of drawings a–d of the embodiment of the invention shown in FIG. 1a. FIG. 3c is a partial detail of the lever arm or FIG. 3a; FIG. 3d is a side elevation of the lever arm assembly of FIG. 3a.

FIG. 6 is a schematic front elevational detail view of the invention shown in FIG. 1.

FIG. 7 is a set of drawings a–c of an embodiment of the invention shown in FIG. 1b, showing movement of the release button aspect of the invention through its range of motion.

FIG. 8 is a set of drawings a–b–b' of another embodiment of the invention; FIG. 8a is a front elevation; FIG. 8b is a rear elevation depicting drag lever at rest; FIG. 8b' is a rear elevation showing drag lever fully engaged.

FIG. 10 is a set of drawings a–c of an aspect of the invention shown in FIG. 9.

FIG. 11 is a set of drawings a–b of two alternate embodiments of an aspect of the invention shown in FIG. 9.

BEST MODE OF CARRYING OUT THE INVENTION

Figure 2B:
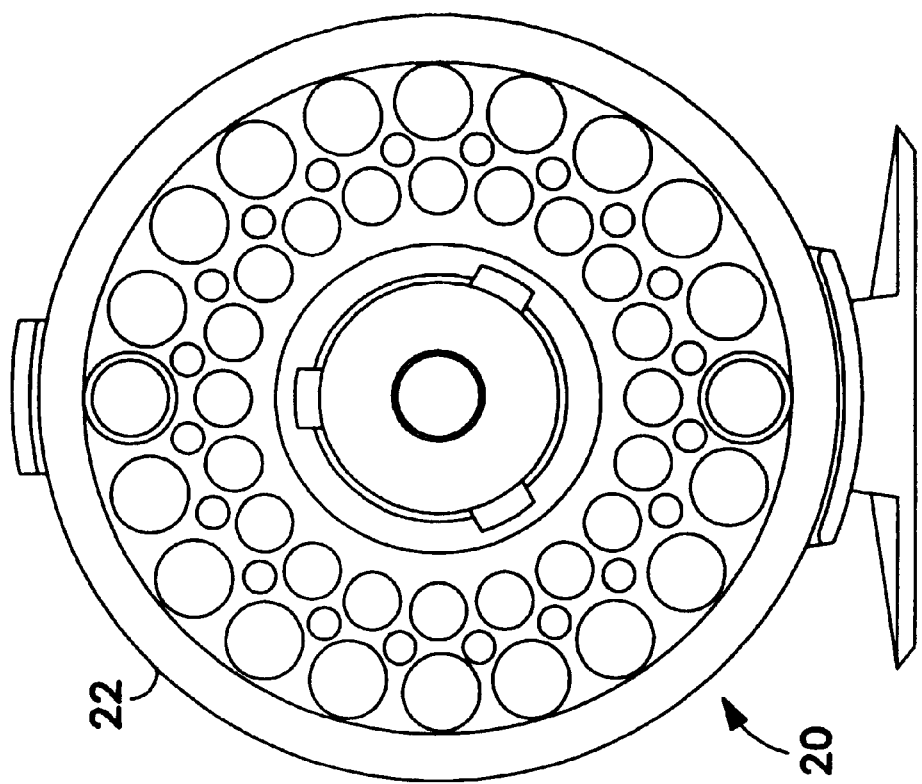
FIG. 2a is a rear elevation and FIG. 2b is a front elevation.

Turning now to the drawings, the invention will be described in preferred embodiments by reference to the numerals of the drawing figures wherein like numbers indicate like parts.

In FIG. 1c, a preferred fly reel 20 of the invention is shown in side elevation. Spool 21 has front rim 22 and rear rim 23 comprising a dual palm drag, with the rear rim 23 exposed by rear case 24. In FIG. 1a, a preferred anti-backlash system of the invention is illustrated. Integral to base 25 (which in preferred embodiments is the rear side/half of bearing housing 49—see FIG. 1b and 4) is brake drum 27.

Within brake drum 27 there rotates a lever base 36 on which is pivotally mounted at pivot point 37 a brake lever 32 and a rotatable counterweight 31 on a counter weight arm 33. Brake pad 35 is preferably removably mounted on the end of brake lever 32 by means of slidable engagement on pins (see FIG. 3), and brake lever 32 and counterweight arm 33 are preferably a single piece of material, and mounted diametrically opposed in a pair on lever base 36.

Each one of the pair of lever arms is bent as illustrated in detail in FIG. 3 for cooperative interaction with the other without interference in a manner, the details of which will be appreciated by those skilled in the art. Brake levers 32 are biased in the braked position by bias springs 34 preferably resiliently interconnecting counterweights 31. One alternate embodiment contemplated is to rig a rotor style brake and ramp system after the manner disclosed herein, and by means of having the movement of the counterweights move the ramp (means of which will it is believed occur to those skilled in the art) to impinge the brake pad on the rotor.

In FIG. 1b, spool 21 is shown mounted on top hat 45, which in turn is keyed for engagement and co-rotation with spindle 46. Spindle 46 turns within preferably sealed bearing units 47 inside of bearing housing 49, which is preferably stationery in use and mounted via screw holes 26 to rear case 24. Rear case 24 is sealably joined to bearing housing 49 in preferred embodiments to keep out salt, water and debris or dust. Mounted preferably on an inner circumference of top hat 45 and resiliently attached thereto by compressible spring attach ring 48 are preferably three retainer springs 42. Removably attached to the front end of spindle 46 by spindle screw 38 is bushing 44, on which is slidably and rotatably mounted release button 41. Release button 41 is resiliently and releasably held in an open or a closed position by the resilient spring action of the rounded ends of springs 42 which, in the closed position (illustrated—see also FIG. 7 for other positions of button 41), engage preferably circumferential detent indentations 43 in button 41. The rounded heads of the springs are themselves preferably compressible and this aids in the mating or engagement of the heads in the indentation(s).

Figure 2A:
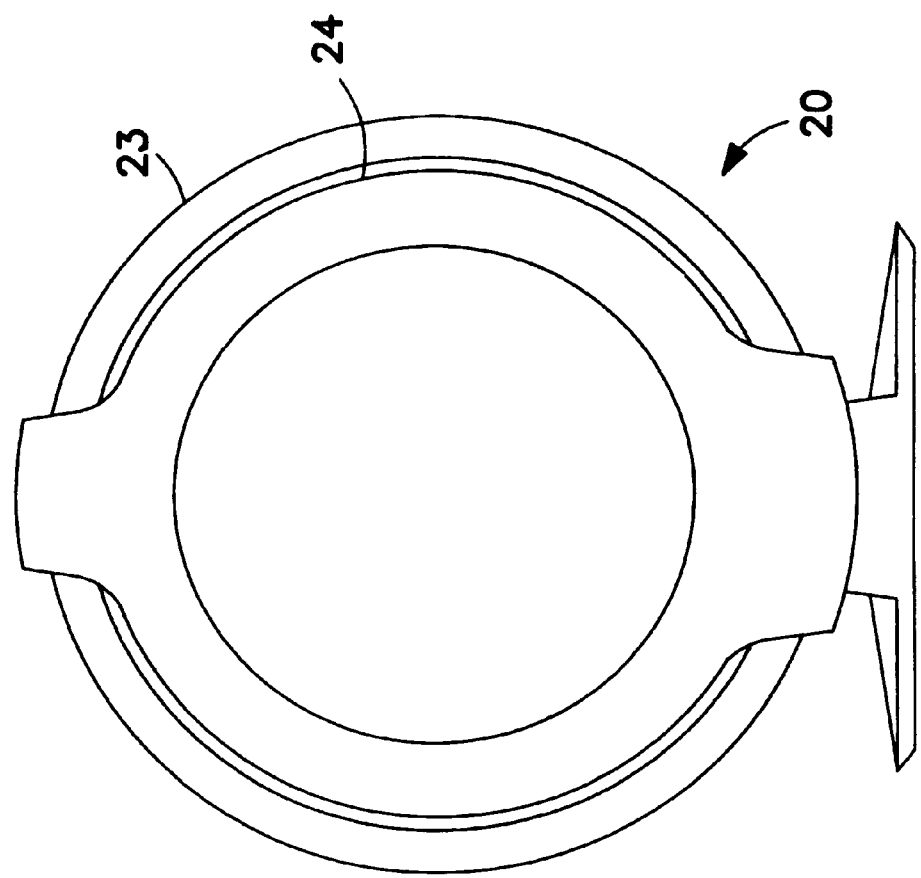

FIG. 2a is a rear elevation of the embodiment shown in FIG. 1. Rear case 24 is illustrated exposing rear rim 23 to contact by the palm of a hand. FIG. 2b is a front elevation showing front rim 23 of spool 21.

Figure 3A:
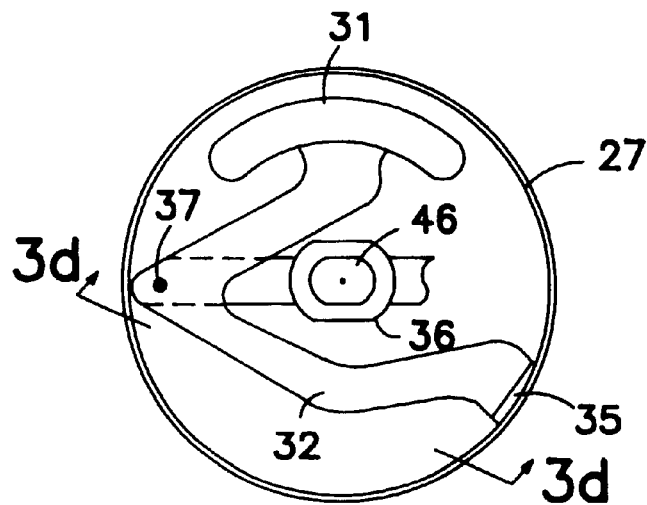
FIG. 3a is a partial cutaway detail.
Figure 3D:
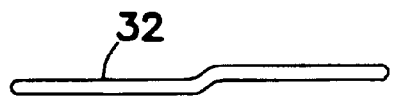
Figure 3C:
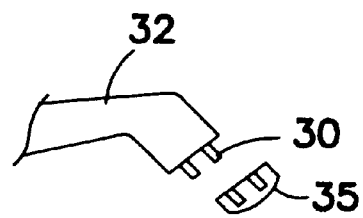
Figure 3B:
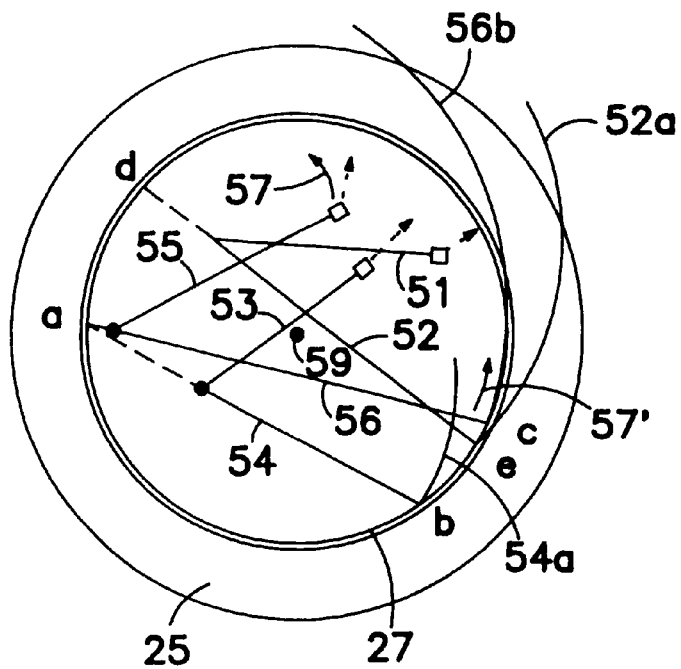
FIG. 3b is a schematic detail.

FIG. 3a is a partial cutaway detail of anti-backlash system shown in FIG. 1a. Lever base 36 is keyably engaged upon spindle 46 and removably held in place by spindle screw 38 (not shown, for sake of clarity). FIG. 3c is a detail of the sliding engagement of brake pad 35 on pins 30 that extend preferably from brake lever 32. FIG. 3d is a side elevation of the brake lever to illustrate its bend to accommodate a second brake lever/counterweight arm unit in the same rotating system. The bend allows both units of a preferred pair of such units to overlap, yet function without interference with each other. FIG. 3b is a schematic representation of several positioning alternatives for brake lever 32. Preferred location 56 intersects with preferred location 55 for counterweight arm along chord a–c across brake drum 27. The brake pad end of lever arm 56 is swingable through arc 56a, which can be seen to pass across a segment of the inner area of the brake drum, thus illustrating a workable positioning for lever arm 56 when acted upon by the centrifugal force (short dotted arrow) acting on the counterweight (small schematic square) at the end of counterweight arm 55 to swing in the direction of curved arrow 57.

In a similar manner, location 54 intersects with alternate location 53 for counterweight arm along chord a–b across brake drum 27. The brake pad end of lever arm 54 is swingable through arc 54a, which can also be seen to pass across a segment of the inner area of the brake drum, thus illustrating a workable positioning for lever arm 54 when acted upon by the centrifugal force (short dotted arrow) acting on the counterweight (small schematic square) at the end of counterweight arm 53.

In contrast, test location 52, which intersects with location 51 for counterweight arm along chord d–e across brake drum 27, and which is swingable through arc 52a, can be seen not to pass across a segment of the inner area of the brake drum, thus illustrating a unworkable positioning for lever arm 52 when acted upon by the centrifugal force (short dotted arrow) acting on the counterweight (small schematic square) at the end of counterweight arm 52, all as will be more fully appreciated by those skilled in the art.

Figure 4:
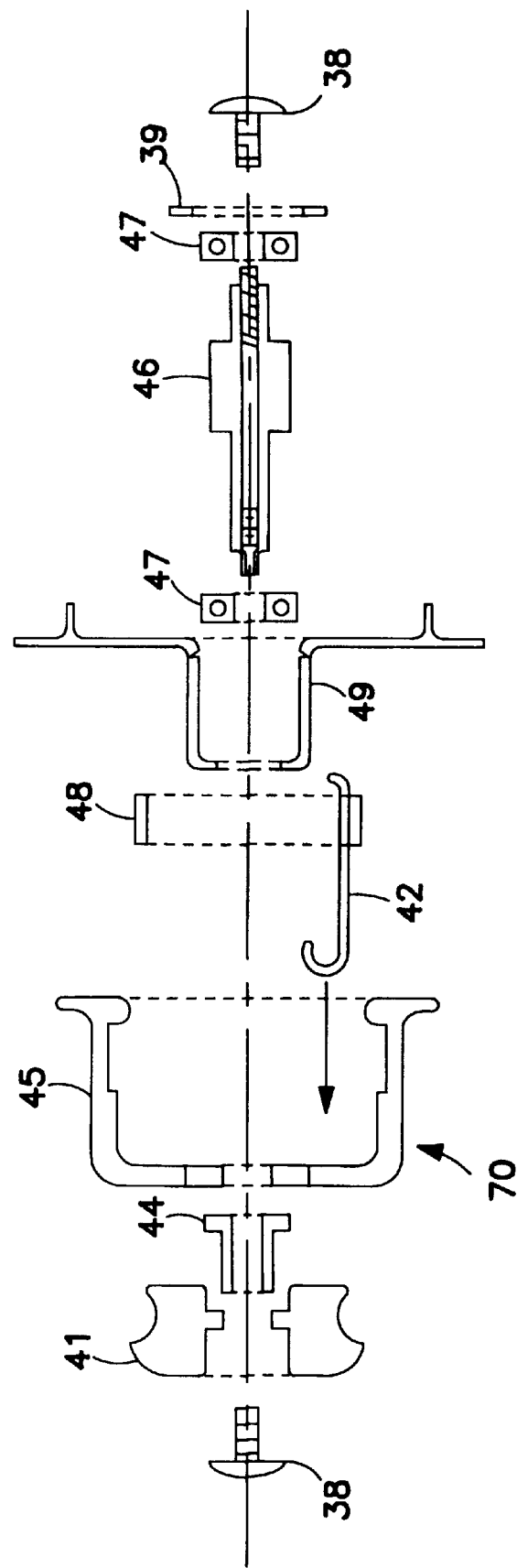
FIG. 4 is an exploded side sectional elevational detail of an aspect of the invention shown in FIG. 1b.

FIG. 4 is an exploded side sectional elevational detail of top hat and spindle assembly shown in FIG. 1b. Top hat 45 is keyed for engagement and co-rotation with spindle 46. Spindle 46 turns within preferably sealed bearing units 47 inside of bearing housing 49. Mounted preferably on an inner circumference of top hat 45 and resiliently attached thereto by compressible spring attach ring 48 are preferably three retainer springs 42 which project, when installed, through spring openings 70 in top hat 45. Removably attached to the front end of spindle 46 by spindle screw 38 is bushing 44, on which is sidably and rotatably mounted release button 41. Rear bearing 47 is held in place by snap ring 39.

Figure 5:
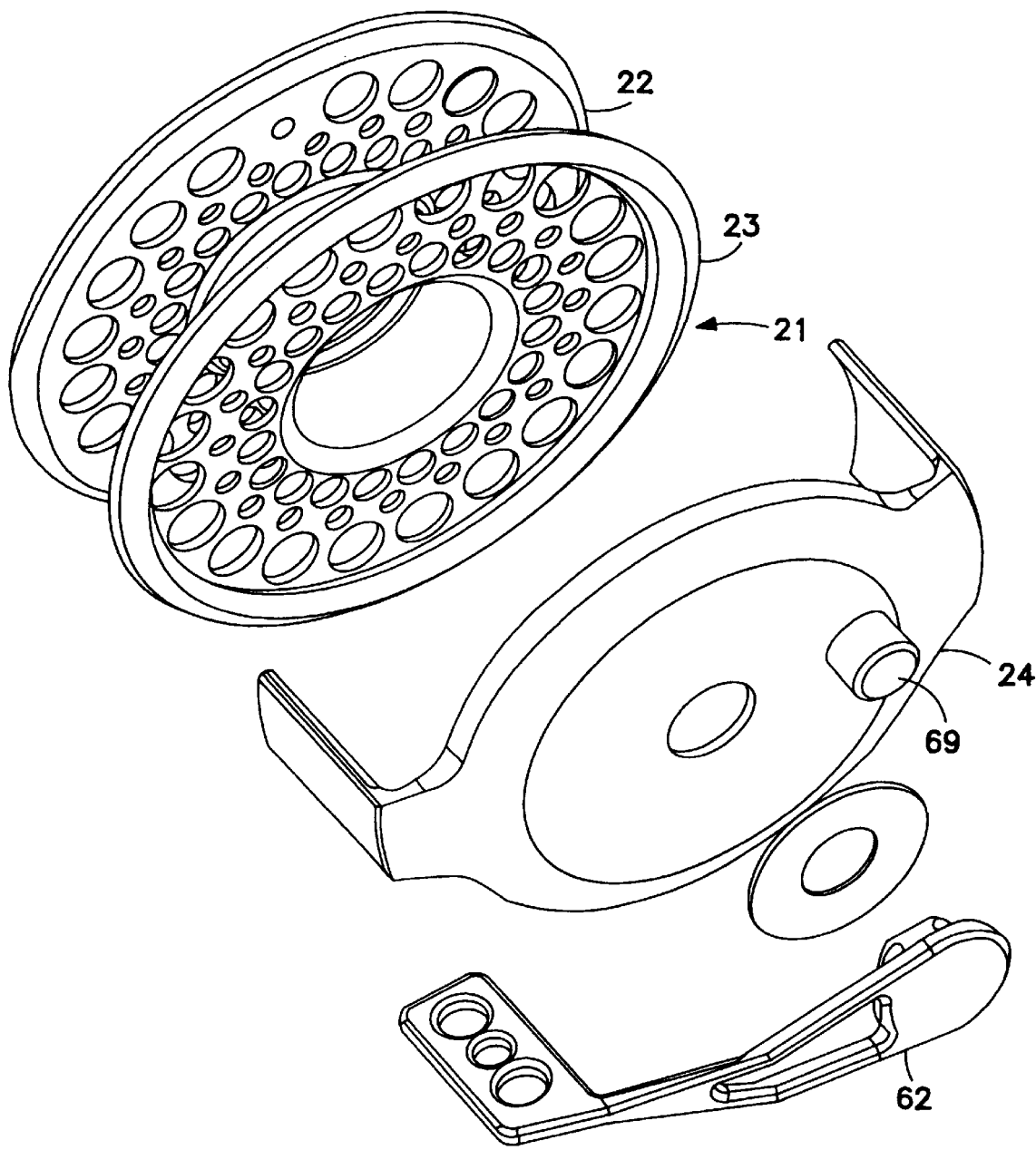
FIG. 5 is a partial (parts omitted) exploded perspective view of an alternate embodiment of the invention.

In FIG. 5 an exploded view of one embodiment of rear case 24 illustrates the design by which rear rim 23 of spool 21 is made accessible for palm dragging. Since the rear case back is large enough to sealably cover the exposed portions of anti-backlash or dynamic drag (or both when both are installed in the same reel), no greater coverage and enclosure of any other part of the reel is necessary or appropriate.

FIG. 6 is a schematic front elevational detail view of spool 21 resiliently centered and mounted upon top hat 45 by the resilient centering action, as will be appreciated by those skilled in the art, of springs 42 through spring openings 70.

In FIG. 7 movement of the release button through its range of motion is illustrated. Bushing 44 is attached to the front end of spindle 46 by spindle screw 38, on which is slidably and rotatably mounted release button 41. Release button 41 is resiliently and releasably held in a closed position in FIG. 7*a* by the resilient spring action of the rounded end of spring 42 matably engaged in circumferential detent indentation 43. In FIG. 7*b* button 41 is passing out of the closed position and into the open (open means the spool is removable) position shown in FIG. 7*c*. In the open position, button 41 is resilient held open by the spring action of spring 42 now engaged into the space between button 41 and top hat 45. This also advantageously releases spool 21 (not shown) for removal, as the resilient tension of springs 42 radially outward against the bore of spool 21 is thereby released.

In FIG. 8, another embodiment of the preferred fly reel of the invention is shown. FIG. 8*a* is a front elevation showing spool 21 engaged upon top hat 45 by springs 42 pressing against preferred spool bevel 28. FIG. 8*b* is a rear elevation depicting drag lever 62 in the "rest" position. In this position, the dynamic drag is unbraked, having no significant frictional engagement of drag pad 65 (see FIGS. 9 and 10) with rotor 61. FIG. 8*b* shows the drag lever in the fully engaged position 62'.

Figure 9:
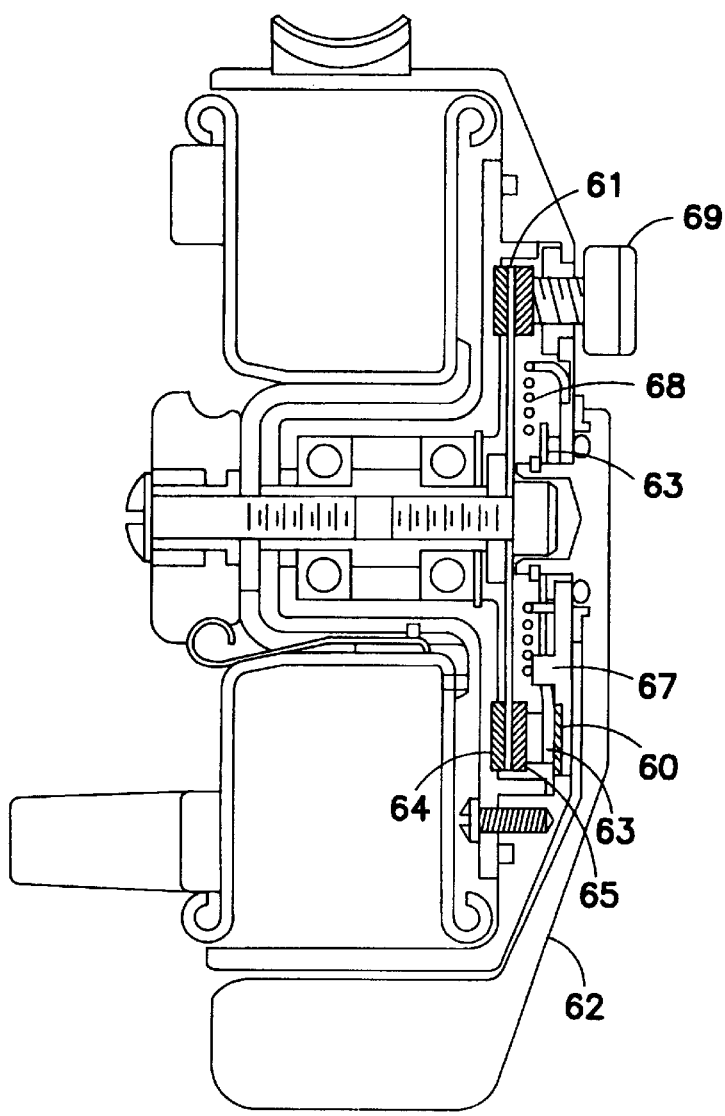
FIG. 9 is a side sectional elevation of the invention shown in FIG. 8.
Figure 10A:
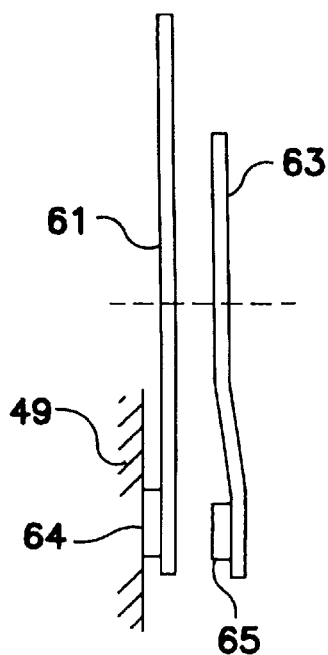
FIG. 10a is a schematic side elevational detail.
Figure 10B:
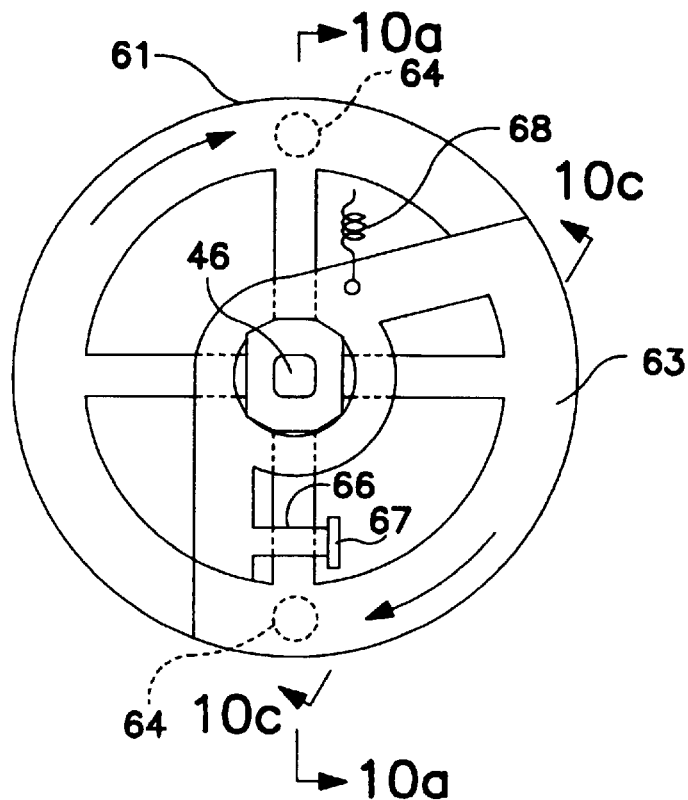
FIG. 10b is a rear elevational partial cutaway detail.
Figure 10C:
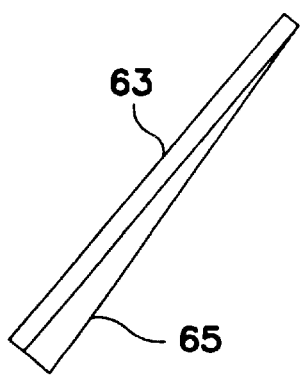
FIG. 10c is a partial side sectional view along line 10c in FIG. 10b.

FIG. 9 is a side sectional elevation of the embodiment shown in FIG. 8. FIG. 10*a* (separation distances exaggerated for illustration purposes only) is a schematic side elevational detail of the engagement of rotor 61 with drag pad 65 on axial eccentric 63. FIG. 10*b* is a rear elevational partial cutaway detail showing the directions of rotation of rotor 61 and axial eccentric 63 (curved arrows). Also shown is bias spring 68 and rotation stop 66 for conventionally limiting the rotation of the eccentric and biasing it to an unbraked position. FIG. 10*c* is a partial side sectional view along line 10*c* in FIG. 10*b* showing the tapered pad 65. In most respects this embodiment is preferably identical to the embodiment shown in FIG. 1. It varies preferably only in the details of the dynamic drag system which in some embodiments replaces the anti-backlash system of the preferred fly reel 20. Conventional static drag screw 69 is shown for reference but is not part of the invention. Rotation of axial eccentric 63 is restricted by stop boss 67 integral to rear case 24. Pressure on rotor 61 from pad 65 is backed up and supported by rotor support 64 in bearing housing 49 so the rotor does not significantly deflect or deform when pressed by brake pad 65. Axial eccentric 63 is operably rotated by engagement with drag lever 62 as illustrated in FIGS. 9 and 5 as will be appreciated by those skilled in the art.

Axial eccentric 63 is preferably formed of fairly thin (0.032 inch) sheet metal. In elevational shape it resembles a large slice of pie, and is referred to sometimes herein as a pie section piece. It is also bent or flared slightly (preferably about 0.026 inch) along the circumference arc of the pie section, so that as a portion of the section circumference is rotated by lever 62 across the zone of the rotor in front of the rotor support 64, it is nearer to or farther from the rotor.

In some embodiments it is contemplated the pie section or ramp piece 63 will come at some point in its rotation range directly into contact with the rotor and thus provide friction braking. In preferred embodiments however, the pie section piece is lined with a cork lining which is also preferably tapered from one end to the other of the arc along which it is attached. The taper may be accomplished by gluing the cork to the section and then sanding the taper in with a surface grinder. Thus the cork comes into friction contact with the rotor, but preferably only to any significant extent in the region of the rotor support 64.

Thus, as will be now appreciated by those skilled in the art, the amount of friction on the rotor increases as the eccentric 63 is rotated in the direction of the curved arrow on the eccentric in FIG. 10*b*. Alternatively, the rear case is optionally provided with thrust pad 60, and the eccentric is turned against this pad to aid in providing controlled thrust of brake pad 65 against rotor 61. This drag brake system is also preferably set up so the rotation of the rotor and the direction of increased friction rotation of the eccentric are such as to avoid the possibility of a friction induced jam of the eccentric and brake pad against the rotor.

Figure 11A:
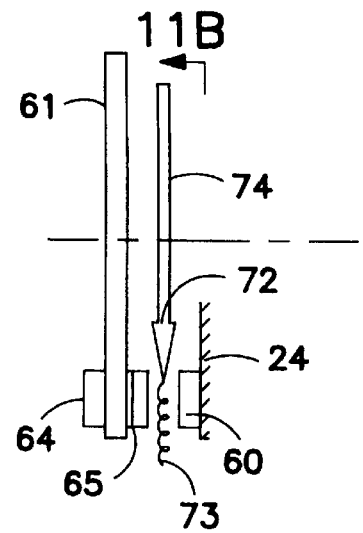
FIGS. 11a and 11b are schematic side elevational detail views.
Figure 11B:
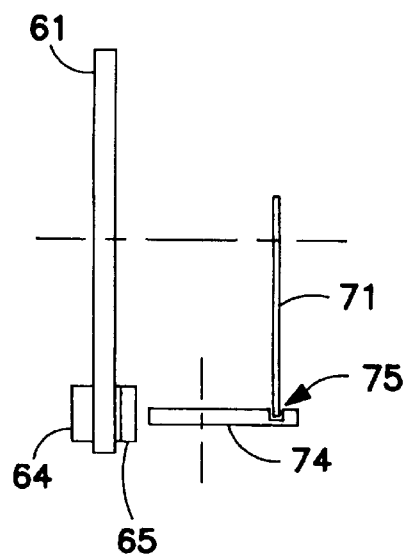

In FIGS. 11*a* and 11*b*, an alternate eccentric mechanism is illustrated for use in the dynamic drag of FIG. 9. Rotor 61 and rotor support function the same in all embodiments; however instead of pie section piece 63, the operative eccentric is a radial eccentric such as a cam 74, rotatably mounted with drag lever 62 to bring an eccentric up against a sidably mounted wedge 72 (which is biased away by spring 73, schematically illustrated), so that the wedgethrusts between brake pad 65 and thrust pad 60 in case 24. In FIG. 11*b*, a similar cam 74 is mounted to rotate on an axis generally perpendicular to the axis of rotation of the rotor, and a cam actuating lever 71 engages a pocket 75 in cam 74, so that when lever 71 is pivoted by drag lever 62, it in turn partially rotates cam 74 to bring an eccentric into bearing contact with brake pad 65 to put friction on rotor 61.

Material compositions and methods of manufacture of most of the parts of invention will be within the scope of knowledge of those skilled in the art; the following specifications are provided to aid in practicing the invention. Rear case 24 is preferably made of aluminum, as is bearing housing 49 (and brake drum 27), top hat 45, spool 21 (which can be solid machined, or conventionally roll formed from sheet stock and put together), brake lever 32, drag lever 62, and brake lever base 36. Rotor 61 is preferably stainless steel, as is spindle 46, and counterweight 31. Bushing 44 is preferably bronze, springs 42 are spring steel, release button 41 is black Delrin, and brake pad 35 is either Delrin® or Teflon® plastic. The material of bias spring(s) 34 are not invariant. Springs of sufficient tension to bias the brake to an "on" or braked position are needed, but it has been found that some experimentation is required to fit and adjust the anti-backlash system to any particular fly rod number. It is believed to be within the skill of those knowledgeable in the art to select and fit appropriate spring materials into the system of the invention.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

Industrial Applicability

The invention provides an interchangeable, relatively low cost fly reel spool and a reel that has improved fishing characteristic in its dual palm drag, dynamic drag, and anti-backlash system. It will find use in all parts of the world wherever there is sport fishing.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A dynamic drag for a fishing reel, the drag comprising:
   (1) a brake rotor and a brake pad moveable into engagement with the rotor;
   (2) a pivotally mounted eccentric engaging the brake pad to force it frictionally against the rotor;
   wherein the eccentric is radially eccentric, the eccentric further comprising a pivotally mounted radial eccentric, a slidably mounted wedge, a bias spring and a thrust pad, whereby lever actuation of the radial eccentric urges the wedge between the brake pad and the thrust pad, against the bias of the bias spring, increasing pressure of the brake pad on the rotor.

2. The dynamic drag of claim 1 wherein the pivotally mounted radial eccentric is a cam.

3. A dynamic drag for a fishing reel, the drag comprising:
   (1) a brake rotor and a brake pad moveable into engagement with the rotor;
   (2) a pivotally mounted eccentric engaging the brake pad to force it frictionally against the rotor;
   wherein the eccentric is radially eccentric, the eccentric further comprising a pivotally mounted cam actuation lever, a cam having a pocket engaging the actuation lever, the cam pivotally mounted to rotate on an axis generally perpendicular to an axis of rotation of the brake rotor, whereby actuation of the lever urges the cam to rotate and apply pressure to the brake pad, increasing pressure of the brake pad on the rotor.

4. A dynamic drag for a fishing reel, the drag comprising:
   (1) a brake rotor and a brake pad moveable into engagement with the rotor;
   (2) a pivotally mounted eccentric engaging the brake pad to force it frictionally against the rotor, the eccentric directly biased by a spring to an unbraked position.

5. The dynamic drag of claim 4 wherein the eccentric is axially eccentric, the eccentric further comprising a pivotally mounted circular section ramp, whereby lever actuation of the ramp rotates it and the brake, increasing pressure of the brake pad on the rotor.

* * * * *